(12) United States Patent
Pursifull et al.

(10) Patent No.: US 11,674,471 B2
(45) Date of Patent: Jun. 13, 2023

(54) METHOD AND SYSTEM FOR OPERATING A FUEL INJECTOR

(71) Applicant: Ford Global Technologies, LLC, Dearborn, MI (US)

(72) Inventors: Ross Pursifull, Dearborn, MI (US); David Oshinsky, Trenton, MI (US); Rani Kiwan, Canton, MI (US); Joseph Lyle Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/820,742

(22) Filed: Aug. 18, 2022

(65) Prior Publication Data

US 2022/0397075 A1 Dec. 15, 2022

Related U.S. Application Data

(62) Division of application No. 17/240,165, filed on Apr. 26, 2021, now Pat. No. 11,454,190.

(51) Int. Cl.
*F02D 41/38* (2006.01)

(52) U.S. Cl.
CPC .. *F02D 41/3845* (2013.01); *F02D 2200/0604* (2013.01); *F02D 2200/0616* (2013.01)

(58) Field of Classification Search
CPC . F02D 41/3094; F02D 19/061; F02D 19/0623
See application file for complete search history.

(56) References Cited

U.S. PATENT DOCUMENTS

| | | | |
|---|---|---|---|
| 9,593,637 B2 * | 3/2017 | Surnilla | F02D 41/221 |
| 11,035,316 B1 * | 6/2021 | Pursifull | F02M 69/465 |
| 2018/0328306 A1 * | 11/2018 | Pursifull | F02D 41/3094 |
| 2020/0116099 A1 * | 4/2020 | Surnilla | F02D 41/0085 |
| 2020/0291885 A1 * | 9/2020 | Pursifull | F02M 65/003 |
| 2020/0291886 A1 * | 9/2020 | Pursifull | F02D 41/0085 |
| 2020/0300189 A1 * | 9/2020 | Pursifull | F02D 41/3845 |

* cited by examiner

*Primary Examiner* — John Kwon
(74) *Attorney, Agent, or Firm* — Vincent Mastrogiacomo; McCoy Russell LLP

(57) ABSTRACT

Methods and systems for adjusting fuel injector operation according to changes in fuel pressure during inter-injection periods are described. The inter-injection period may be before and after fuel is injected to an engine. The methods and systems described herein may be suitable for direct and port fuel injectors.

7 Claims, 5 Drawing Sheets

METHOD AND SYSTEM FOR OPERATING A FUEL INJECTOR

CROSS REFERENCE TO RELATED APPLICATION

The present application is a divisional of U.S. Non-Provisional patent application Ser. No. 17/240,165, entitled "METHOD AND SYSTEM FOR OPERATING A FUEL INJECTOR", and filed on Apr. 26, 2021. The entire contents of the above-listed application are hereby incorporated by reference for all purposes.

FIELD

The present description relates generally to methods and systems for adjusting operation of fuel injectors that inject fuel to an internal combustion engine.

BACKGROUND/SUMMARY

A fuel injector may be operated to precisely meter fuel flow to an engine cylinder. However, two injectors that are of a same type may inject slightly different amounts of fuel even when commanded to deliver equal amounts of fuel. The differences in fuel injection amount may be related to differences of materials used in manufacturing the fuel injectors and component tolerances. One way to reduce the variance is to determine how much fuel is injected by a fuel injector in response to a fuel injection command. The amount of fuel that is injected may be estimated using a fuel pressure drop in a fuel rail. The amount of fuel that the fuel injector injects may be corrected based on the pressure drop in the fuel rail during a prior injection. While this approach removes some error in the amount of fuel that is injected by a fuel injector, there may still be opportunity for improvement.

In one example, the above issue may be addressed by a method for operating a fuel injector, comprising: estimating a fuel pressure drop in a fuel rail due to injecting a fuel via a fuel injector according to an average fuel pressure before injecting the fuel, an average fuel pressure after injecting the fuel, a slope of fuel pressure during an inter-injection period before injecting the fuel, and a slope of fuel pressure during an inter-injection period after injecting the fuel; and adjusting fuel injected subsequently via the fuel injector based on the estimated fuel pressure drop.

By compensating for slopes of fuel pressure before and after a fuel injection event, it may be possible to provide a technical result of improving accuracy of an amount of fuel that is injected by a fuel injector to an engine. Specifically, fuel pressure changes within a fuel rail during inter-injection periods (e.g., periods when none of the engine's cylinders are injecting fuel) that may affect fuel flow through a fuel injector may be a basis for adjusting a fuel correction parameter that may be applied to subsequent fuel injections so that amounts of fuel injected may be closer to requested amounts of fuel to be injected. These sloped pressure changes that take place during the inter-injection period may be related to thermal gain/loss in the fuel pressurized within the fuel rail and not related to fuel injection.

The approach described herein may have several advantages. In particular, the approach may reduce errors in an amount of fuel that is injected to an engine. Further, the approach compensates for fuel pressure changes in a fuel rail that may be due to thermal changes in a fuel rail. In addition, the approach may be performed while a vehicle is operating on a road.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
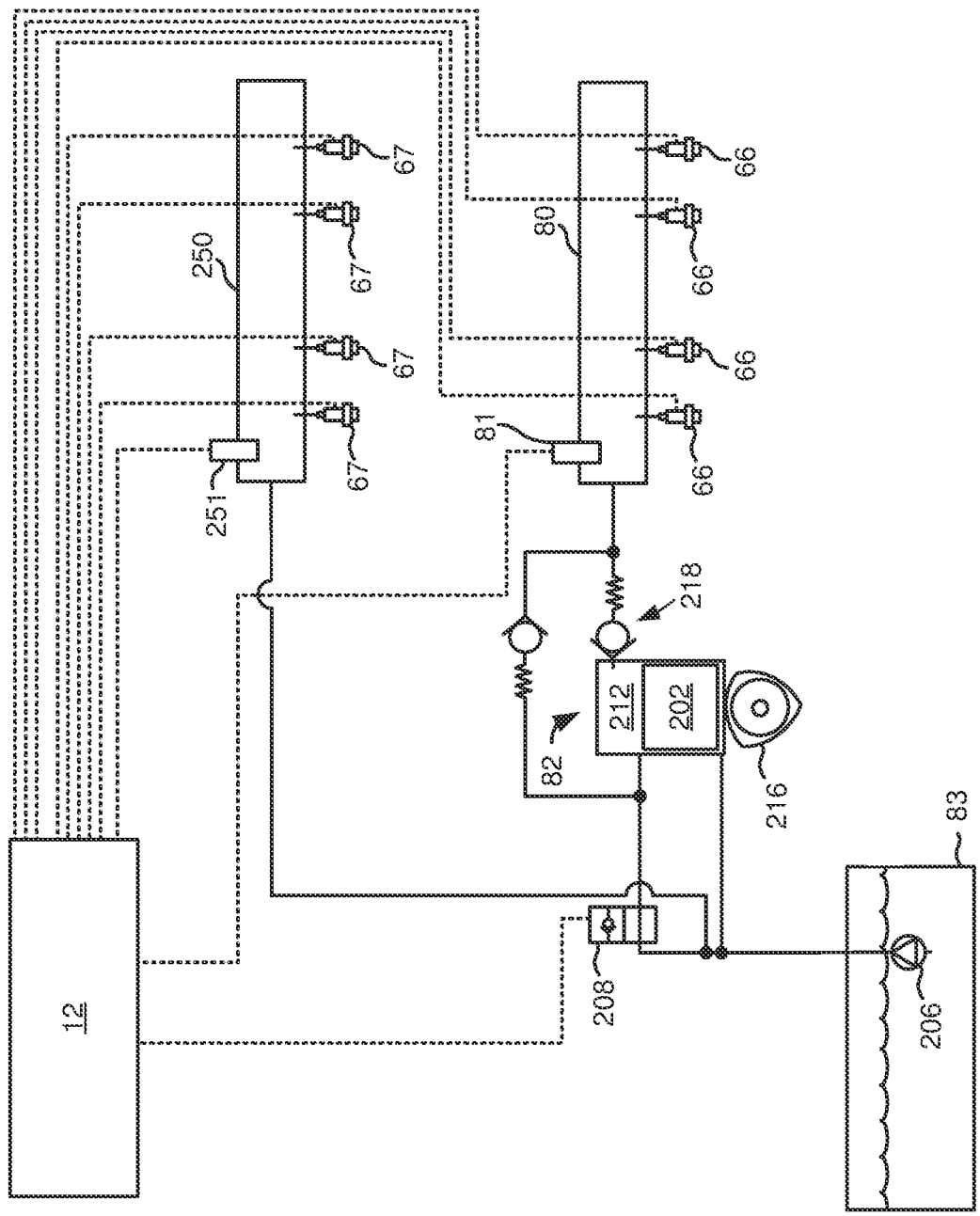
FIG. 2 shows a schematic view of an example fuel system.
Figure 3:
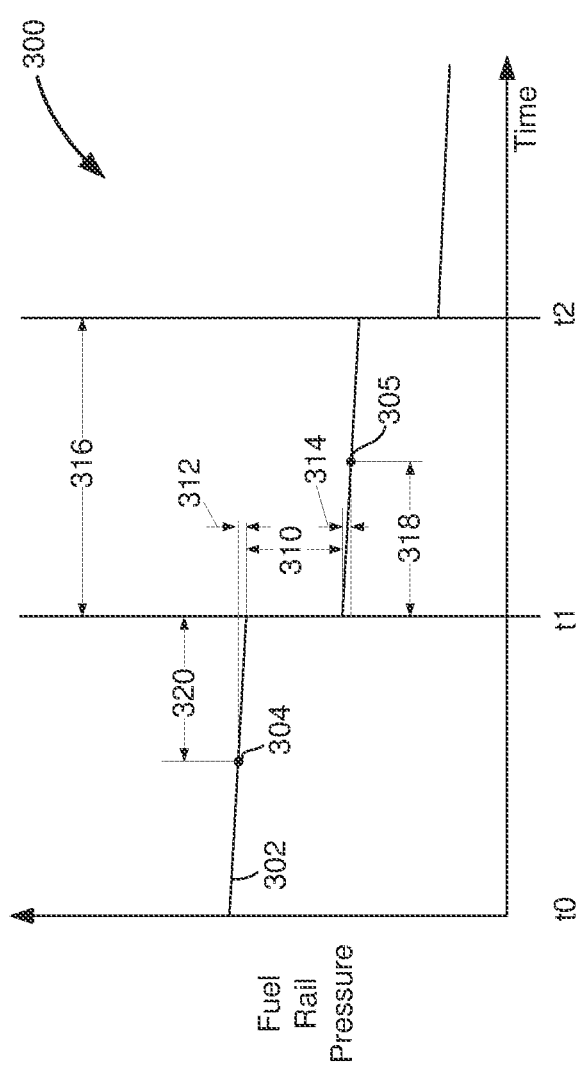
FIGS. 3 and 4 show graphic representations of fuel pressures that may be compensated according to the method of FIG. 5.
Figure 4:
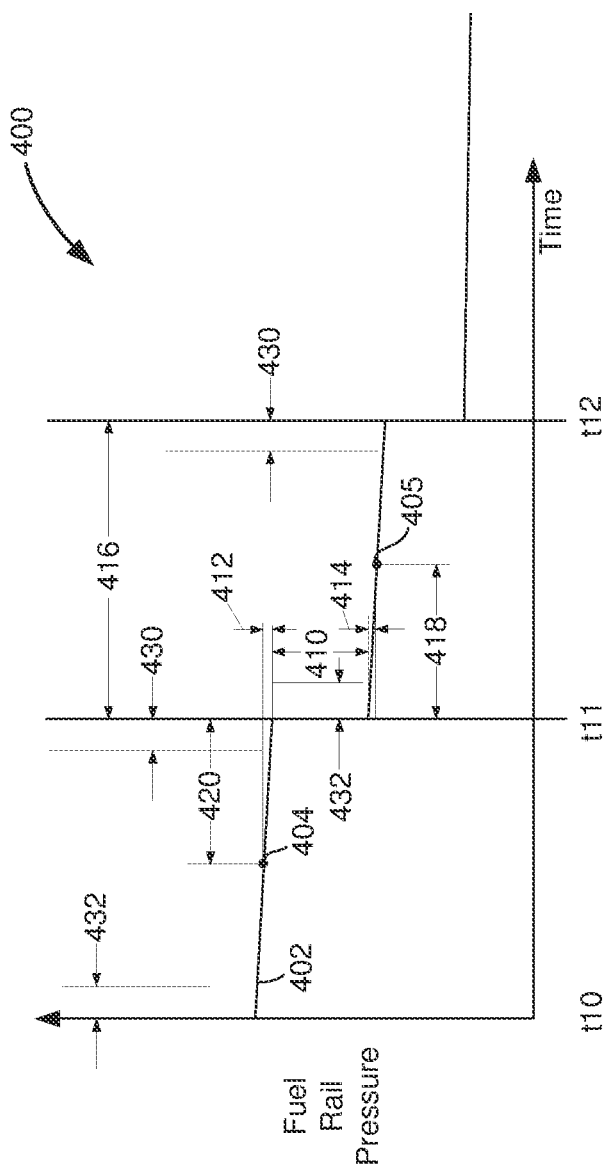

The following description relates to systems and methods for correcting amounts of fuel that are injected to an engine. In particular, requested amounts of fuel to be injected may be adjusted according to pressure changes in a fuel rail. The fuel injectors may be included in an engine of the type shown in FIG. 1. The fuel injectors may be part of a fuel system as shown in FIG. 2. Pressure changes during inter-injection periods that may affect an amount of fuel injected by a fuel injector during fuel injection are shown in FIGS. 3 and 4. Amounts of fuel injected by a fuel injector may be compensated for inter-injection pressure changes according to the method of FIG. 5.

Figure 1:
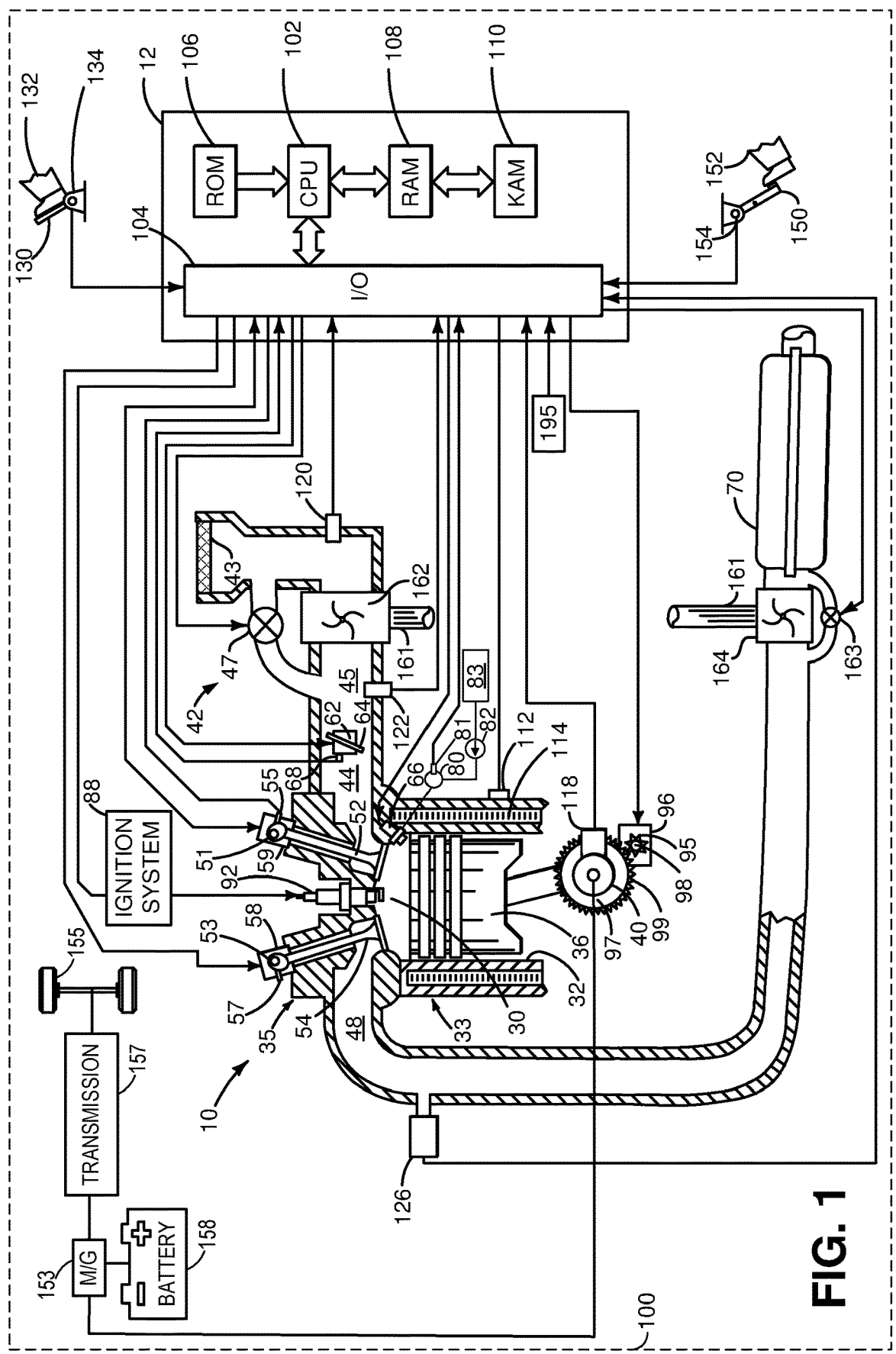
FIG. 1 is a schematic diagram of an engine system.

Referring to FIG. 1, an internal combustion engine 10 is shown. Engine 10 may be included in a drivetrain of a vehicle 100 configured for on-road propulsion. In one example, vehicle 100 is a hybrid electric vehicle. However, vehicle 100 may be a conventional vehicle that includes only an internal combustion engine as a source of propulsive effort.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system including a fuel tank 83, fuel pump 82, and fuel rail 80. Pressure in fuel rail 80 may be determined via pressure sensor 81. In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. The propulsive effort pedal and brake pedal may be combined for example in a pivoting setup to select either increasing vehicle speed or decreasing vehicle speed. Further, the propulsive effort pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

The controller 12 receives signals from the various sensors of FIG. 1 and employs the various actuators of FIG. 1, such as throttle 62, fuel injector 66, spark plug 92, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 100 may be a hybrid vehicle with multiple sources of torque available to one or more vehicle wheels 155. In other examples, vehicle 100 is a conventional vehicle with only an internal combustion engine, or an electric vehicle with only electric machine(s). In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. In the depicted example, a first clutch 156 is provided between crankshaft 40 and electric machine 153. Electric machine 153 is shown directly coupled to transmission 157. Controller 12 may send a signal to an actuator of each clutch 156 to engage or disengage the clutch, so as to connect or disconnect crankshaft 40 from electric machine 153 and the components connected thereto, and/or connect or disconnect electric machine 153 from transmission 157 and the components connected thereto. In other examples, clutches need not be included. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

Referring now to FIG. 2, a detailed illustration of a fuel system that supplies fuel to an engine is shown. The fuel system of FIG. 2 may be monitored and controlled in the engine system of FIG. 1 via the method of FIG. 5.

Fuel system 200 includes various valves and pumps that are controlled by controller 12. Fuel pressure in fuel rail 80 is sensed via pressure sensor 81. Controller 12 controls pressure in fuel rail 80 using pressure feedback from pressure sensor 81. Controller 12 activates low pressure fuel pump 206 to supply fuel to fuel pump flow metering valve 208 and optional port fuel injectors 67. Fuel pump flow metering valve 208 controls the amount of fuel entering high pressure fuel pump 82. Thus, pressure in fuel rail 80 may be adjusted via adjusting a position of metering valve 208. Cam 216 is driven by the engine 10 (of FIG. 1) and it provides motive force to piston or plunger 202 which operates on fuel in pump chamber 212.

High pressure fuel pump 82 directs fuel to fuel injector rail 80 via check. Fuel pressure in fuel rail 80 may be controlled via adjusting valve 208. Fuel rail 80 may provide fuel to one cylinder bank of an engine via direct fuel injectors 66.

Low pressure fuel pump 206 may also supply fuel to fuel rail 250. Port fuel injectors 67 may be supplied fuel via fuel rail 250. Pressure in fuel rail 250 may be determined via pressure sensor 251. Fuel that is not injected during an engine cycle may be returned to fuel tank 83.

As such, fuel controls such as fuel injection timing and an amount of fuel injected may account for a difference between a scheduled fuel pulse width that is computed based on a last update of cylinder air charge estimate and a fuel pulse width realized. The pressure of the fuel rail 80 may vary over the course of an injection event with the pressure increasing during a stroke of the high pressure fuel pump 82 and then decreasing as fuel is delivered from the direct injectors 66. Therefore, there may be a change in fuel rail pressure between the time of scheduling of a fueling event and the actual fuel injection. This pressure difference may lead to less reliable estimations of an amount of fuel injected. Inaccurate estimation of a difference between a requested amount of fuel injected and an actual amount of fuel injected (fueling difference) may result in inaccuracies in future injection event scheduling.

After a first injection of fuel to a cylinder via a direct fuel injector 66 coupled to the cylinder and before a second injection of fuel to the cylinder, a pressure in the fuel rail 80 coupled to the direct fuel injector 66 may be sampled via controller 12. Upon completion of the first injection of fuel to the cylinder, a fueling amount (mass or volume) difference for the first injection may be estimated based on a change in pressure in the fuel rail during the first injection, and a second injection of fuel to the cylinder via the direct fuel 66 injector may be scheduled based on the prior fueling difference which may be an excess or a deficit. Scheduling the second injection of fuel may include scheduling a time of initiation of the second injection and an amount of fuel to be injected during the second injection based on the fueling difference. The second injection of fuel may be carried out immediately succeeding the first injection of fuel without any injection events for the cylinder in between. The fueling difference may be estimated as a difference between an expected amount of fuel delivered to the cylinder during the first injection and an actual amount of fuel delivered to the cylinder during the first injection. The expected amount of fuel delivered may be a function of the change in pressure in the fuel rail 80 during the first injection. In one example, the change in pressure may be determined as described in detail with regard to FIG. 5.

Thus, the system of FIGS. 1 and 2 provides for an engine system, comprising: an engine including a fuel injector; and a controller with computer readable instructions stored on non-transitory memory that when executed cause the controller to: adjust an amount of fuel injected by a fuel injector in response to a change in fuel pressure in a fuel rail before a preceding fuel injection by the fuel injector and in response to a change in fuel pressure after the preceding fuel injection by the fuel injector. The engine system includes where the change in fuel pressure in the fuel rail before the preceding fuel injection is during an inter-injection period immediately before the preceding fuel injection. The system includes where the change in fuel pressure in the fuel rail after the preceding fuel injection is during an inter-injection period immediately following the preceding fuel injection.

In some examples, the engine system further comprises additional instructions to estimate the change in fuel pressure according to an average fuel pressure before the preceding fuel injection, and an average fuel pressure after the preceding fuel injection injecting the fuel. The engine system includes where the change in fuel pressure before the preceding fuel injection is based on a slope of fuel pressure during an inter-injection period before the preceding fuel injection. The engine system includes where the change in fuel pressure after the preceding fuel injection is based on a slope of fuel pressure during an inter-injection period after the preceding fuel injection. The engine system further comprises additional instructions that cause the controller to estimate the change in fuel pressure based on a half period of the inter-injection period before the preceding fuel injection. The engine system further comprises additional instructions that cause the controller to estimate the change in fuel pressure based on a half period of the inter-injection period after the preceding fuel injection.

The present description provides a way to return an accurate pressure drop due to injection in the presence of a "pressure slope" due to thermal gain/loss in the fuel rail. Left unaccounted, a down slope (e.g., negative slope) makes the fuel pressure drops appear larger than actual and an up slope (e.g., positive slope) makes the fuel pressure drops look smaller than actual. The inventors have observed that following soon after a pump stroke, the fuel pressure slope is negative. Shortly before another pump stroke occurs, the fuel pressure slope is positive. Such conditions if unaccounted may have the potential to be highly deleterious to PBIB's purpose of balancing injectors.

Referring now to FIG. 3, a plot that graphically illustrates how a pressure drop due to injection of fuel may be distinguished from a fuel pressure change that may be due to heating and cooling within a fuel rail is shown. Plot 300 includes a vertical axis and a horizontal axis. The vertical axis represents pressure in a fuel rail, or fuel rail pressure, and pressure within the fuel rail increases in the direction of the vertical axis arrow. The horizontal axis represents time and time increases from the left side of the figure to the right side of the figure. Trace 302 represents pressure in a fuel rail. The sequence of FIG. 3 may be provided by raising pressure in fuel rail to a predetermined threshold pressure, deactivating the high pressure fuel pump after pressure in the fuel rail reaches the threshold pressure, then injecting fuel sequentially into the engine according to the engine's firing order. Each time fuel is injected, pressure in the fuel rail falls since less fuel is held in the fuel rail.

At time t0, a fuel injection by a fuel injector completes (not shown) and pressure in the fuel rail begins to gradually decrease due to cooling of the fuel rail. The time between time t0 and time t1 is an inter-injection time where fuel is not injected to the engine. The amount of time between time t0 and t1 is an inter-injection period. One half of the inter-injection period is indicated at 320. The average pressure in the fuel rail between time t0 and time t1 is the pressure at 304. The fuel pressure at 304 may be referred to as an average preceding inter-injection pressure and it may be denoted as: $\overline{p_i}$.

At time t1, fuel is injected to the engine and the fuel rail pressure drops due to fuel leaving the fuel rail and the fuel rail not being supplied with additional fuel. The time between time t1 and time t2 is a second inter-injection time where fuel is not injected to the engine. The time between time t1 a time t2 may also be referred to as an inter-injection period and the inter-injection period is indicated at 316. The actual fuel pressure drop that is due to the fuel injection at time t1 is indicated at 310 and it may be denoted as: $\delta \overline{p_i}^T$. Additionally, there is a fuel pressure drop between the average inter-injection period pressure at 304 and fuel pressure at the beginning of fuel injection at time t1. The fuel pressure drop between the average inter-injection period pressure at 304 and the fuel pressure at the beginning of fuel injection at time t1 is indicated by the distance at 312 and it may be denoted as:

$$-\alpha_i \cdot \frac{T}{2},$$

where $\alpha_i$ is the slope of pressure indicated by trace 302 between 304 and time t1. T/2 is the half inter-injection period indicated at 320. The slope of a particular inter-injection period may be determined via a least squares fit to the fuel rail pressure versus inter-injection time via the following equation:

$$\text{slope} = \frac{\left(\sum_{k=1}^{n} t_k P_k\right) - (n \cdot \overline{t} \cdot \overline{P})}{\sum_{k=1}^{n} t_k^2 - n \cdot \overline{t}^2},$$

where n is the total number of data pairs in the relationship between fuel rail pressure and inter-injection time, $t_k$ is the inter-injection time for the $k^{th}$ sample, and $P_k$ is the fuel rail pressure for the $k^{th}$ sample. Alternatively, the slope may be determined via other known methods.

At time t2, fuel is injected to the engine again and the fuel rail pressure drops again. The plot ends shortly after time t2. The average inter-injection fuel pressure between time t1 and time t2 is indicated at 305. Half of the subsequent inter-injection period is indicated at 318. The fuel pressure drops between the fuel pressure at the end of fuel injection at time t1 and the average subsequent inter-injection fuel pressure indicated at 305. The fuel pressure at 305 may be referred to as an average subsequent inter-injection pressure and it may be denoted as: $\overline{p_{i+1}}$. The pressure drop between time t1 and the average inter-injection fuel pressure indicated at 305 is indicated by the distance at 314 and it may be denoted as:

$$-\alpha_{i+1} \cdot \frac{T}{2},$$

where $\alpha_{i+1}$ is the slope of the subsequent pressure drop indicated by trace 302 between time t1 and 305. T/2 is the half inter-injection period indicated at 318.

The actual pressure drop for the fuel injection at time t1 may be expressed via the following equation:

$$\delta p_i^T = \overline{p_i} - \overline{p_{i+1}} + \alpha_i \frac{T}{2} + \alpha_{i+1} \frac{T}{2},$$

where the variables are as previously described. Accordingly, the actual pressure drop due to injecting fuel may be determined from the average inter-injection fuel pressures before and after the fuel injection, the slopes of fuel pressure before and after fuel injection, and the inter-injection period T.

Referring now to FIG. 4, a plot that graphically illustrates how a pressure drop due to injection of fuel may be distinguished from a fuel pressure change that may be due to heating and cooling within a fuel rail according to a second method is shown. Fuel pressure in a fuel rail may oscillate for a short time before and a short time after fuel is injected via a fuel injector. The oscillations may make it more difficult to process average fuel pressures and slopes of fuel rail pressure during inter-injection periods. Therefore, it may be desirable to exclude a short time before a fuel injection and a short time after fuel injection from fuel pressure that is applied to determine an actual pressure drop due to fuel injection. FIG. 4 illustrates how a time before and a time after fuel is injected into the engine may be excluded from estimating a pressure drop in a fuel rail that is due to fuel injection.

Similar to plot 300, plot 400 includes a vertical axis and a horizontal axis. The vertical axis represents pressure in a fuel rail or fuel rail pressure and pressure within the fuel rail increases in the direction of the vertical axis arrow. The horizontal axis represents time and time increases from the left side of the figure to the right side of the figure. Trace 402 represents pressure in a fuel rail. The sequence of FIG. 4 may be provided by raising pressure in fuel rail to a predetermined threshold pressure, deactivating the high pressure fuel pump after pressure in the fuel rail reaches the threshold pressure, then injecting fuel sequentially into the engine according to the engine's firing order. Each time fuel is injected, pressure in the fuel rail falls since less fuel is held in the fuel rail.

At time t10, a fuel injection by a fuel injector completes (not shown) and pressure in the fuel rail begins to gradually decrease due to cooling of the fuel rail. The time between time t10 and time t11 is an inter-injection time where fuel is not injected to the engine. The amount of time between time t10 and t11 is an inter-injection period. A subsequent time after the injection at time t10 where it may be desirable to exclude fuel pressure data from the estimate of the fuel pressure drop at time t11 is indicated at 432 and this time may be denoted as x. A preceding time before the injection at time t11 where it may be desirable to exclude fuel pressure data from the estimate of the fuel pressure drop at time t11 is indicated at 430 and this time may be denoted as y. The average pressure in the fuel rail between time (t10+x) and time (t11−y) is the pressure at 404 (404 is halfway in between time (t10+x) and time (t11−y)). The fuel pressure at 404 may be referred to as a preceding inter-injection pressure and it may be denoted as $\overline{p_i}$. The duration from 404 to time t11 is indicated at 420.

At time t11, fuel is injected to the engine and the fuel rail pressure drops due to fuel leaving the fuel rail and the fuel rail not being supplied with additional fuel. A subsequent time after the injection at time t11 where it may be desirable to exclude fuel pressure data from the estimate of the fuel pressure drop at time t11 is indicated at 432 and this time may be denoted as x. A preceding time before the injection at time t12 where it may be desirable to exclude fuel pressure data from the estimate of the fuel pressure drop at time t11 is indicated at 430 and this time may be denoted as y. The time between time t11 and time t12 is a second inter-injection time where fuel is not injected to the engine. The time between time t11 a time t12 may also be referred to as an inter-injection period and the inter-injection period is indicated at 416. The actual fuel pressure drop that is due to the fuel injection at time t11 is indicated at 410 and it may be denoted as $\delta p_i^T$. Additionally, there is a fuel pressure drop between the average inter-injection period pressure at 404 and fuel pressure at the beginning of fuel injection at time t11. The fuel pressure drop between the average inter-injection period pressure at 404 and the fuel pressure at the beginning of fuel injection at time t11 is indicated by the distance at 412 and it may be denoted as $$-\alpha_i \cdot \frac{(T-x+y)}{2},$$

where $\alpha_i$ is the slope of pressure indicated by trace 402 between 404 and time t11 (fuel rail pressure samples between 404 and time (t11−y) may be used to compute the slope $\alpha_i$). T is the inter-injection period, x is as previously described, and y is as previously described. The duration indicated by 420 is equal to $$\frac{(T-x+y)}{2}.$$

At time t12, fuel is injected to the engine again and the fuel rail pressure drops again. The plot ends shortly after time t12. The average inter-injection fuel pressure between time (t11+x) and time (t12−y) is indicated at 405 (405 is halfway in between time (t11+x) and time (t12−y)). The duration from t11 to time 405 is indicated at 418. The fuel pressure drops between the fuel pressure at the end of fuel injection at time t11 and the average inter-injection fuel pressure indicated at 405. The fuel pressure at 405 may be referred to as an average preceding inter-injection pressure and it may be denoted as: $\overline{P_{i+1}}$. The pressure drop between time t11 and the average inter-injection fuel pressure indicated at 405 is indicated by the distance at 414 and it may be denoted as $$-\alpha_{i+1} \cdot \frac{(T+x-y)}{2},$$

where $\alpha_{i+1}$ is the slope of the subsequent pressure drop indicated by trace 402 between time t11 and 405 (fuel rail pressure samples between time (t11+x) and time 405 may be used to compute the slope $\alpha_{i+1}$). T is the inter-injection period, x is as previously described, and y is as previously described. The duration indicated by 418 is equal to $$\frac{(T+x-y)}{2}.$$

The actual pressure drop for the fuel injection at time t11 may be expressed via the following equation:

$$\delta p_i^T = \overline{p_i} - \overline{p_{i+1}} + \alpha_i \frac{(T-x+y)}{2} + \alpha_{i+1} \frac{(T+x-y)}{2},$$

where the variables are as previously described. Accordingly, the actual pressure drop due to injecting fuel may be determined from the average inter-injection fuel pressures before and after the fuel injection, the slopes of fuel pressure before and after fuel injection, the inter-injection period T, and times x and y where fuel rail pressure data is disregarded and not used to determine the drop in fuel pressure in the fuel rail.

Figure 5:
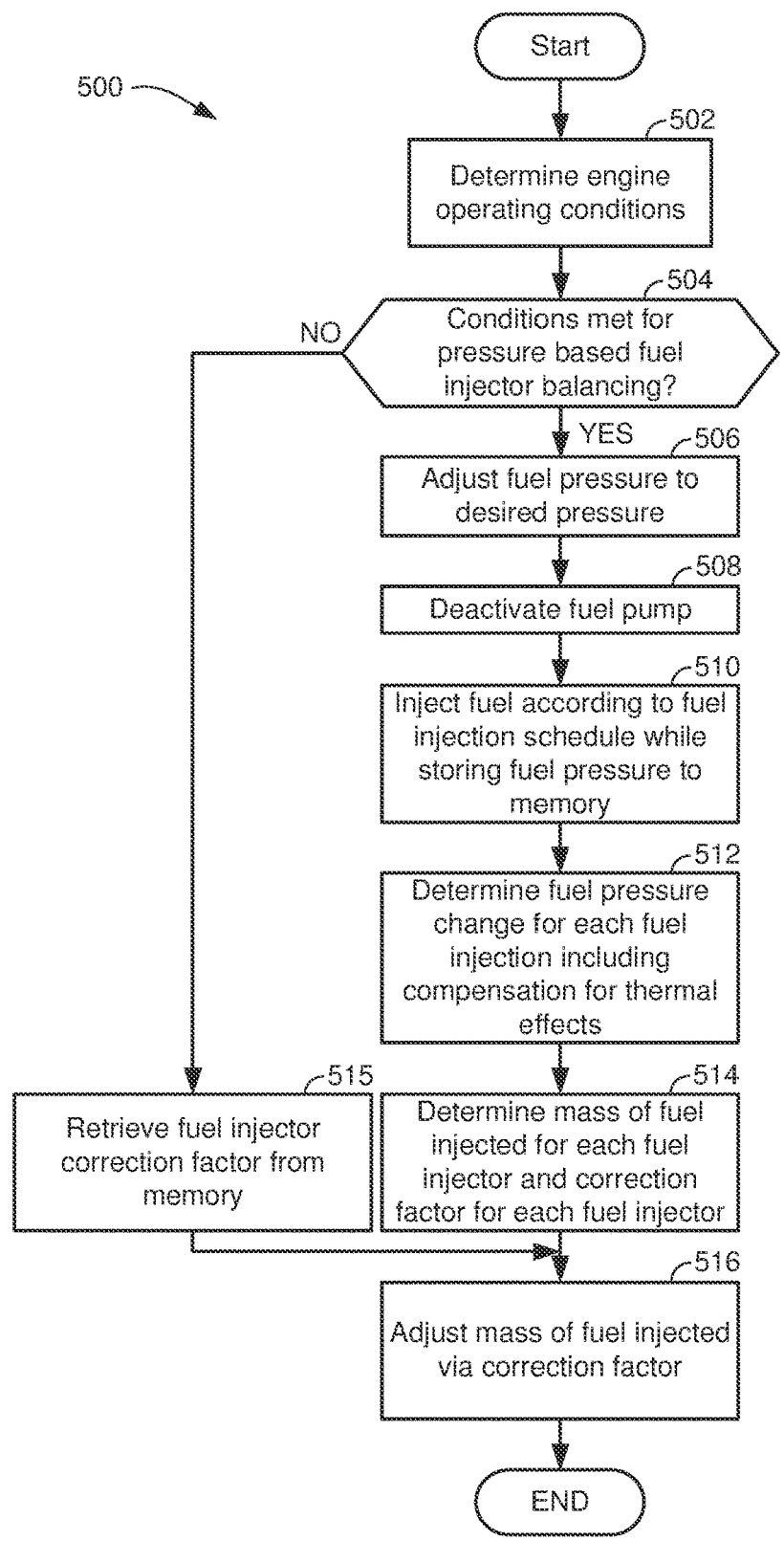
FIG. 5 shows a high level flowchart of an example method for compensating for pressure changes in a fuel system.

Referring now to FIG. 5, a high level flow chart of an example method 500 for adjusting operation of a fuel injector is shown. The method of FIG. 5 may be incorporated into the system of FIGS. 1 and 2 as executable instructions stored in controller non-transitory memory. In addition, other portions of method 500 may be performed via a controller transforming operating states of devices and actuators in the physical world. The controller may employ engine actuators of the engine system to adjust engine operation.

At 502, method 500 determines operating conditions. The engine and vehicle operating conditions may be determined via the sensors and actuators described herein. In one example, the operating conditions may include but are not limited to ambient temperature, ambient pressure, engine temperature, engine speed, vehicle speed, fuel rail pressure, and driver demand pedal position. Method 500 proceeds to 504.

At 504, method 500 judges if conditions are present for performing pressure based fuel injector balancing. In one example, pressure based fuel injector balancing may be performed during conditions where engine temperature is greater than a threshold temperature and driver demand torque or power is less than a threshold. If method 500 judges that conditions are present to perform pressure based fuel injector balancing, the answer is yes and method 500 proceeds to 506. Otherwise, the answer is no and method 500 proceeds to 515. In another example condition, PBIB test pulses may be issued where normally the engine controller would call for only PFI and no DI operation. In this way, the DI injection amount may not be inadvertently reduced should it be needed for charge cooling or pre-ignition prevention.

At 506, method 500 begins to perform pressure based fuel injector balancing. Pressure based fuel injector balancing may be performed according to the method described in U.S. Pat. No. 7,717,088 which is hereby fully incorporated by reference.

The controller runs a calibration injection sequence for a predetermined K number of times (e.g., 3 times). The routine may also predetermine the order in which injectors are to be activated in the calibration injection sequence. It may determine when and how many times each injector may be activated (e.g., opened from a closed position) during a calibration injection sequence. It may further include a counting mechanism to keep track of the activation of injectors and make sure fuel injection is cycled through all injectors before proceeding to the next calibration injection sequence. For example for a 4-cylinder engines with 4 injectors, the routine may predetermine that calibration will proceed in the following sequences for a calibration injection sequence: injector #1, #2 #3, #4 and the calibration injection sequence may be repeated 3 times in a fuel injector calibration routine. The routine may also determine that the fuel injector calibration routine may be repeated after a predetermined amount of time has elapsed (e.g., 10 min) after the conclusion of the last Fuel Injector Calibration Routine.

The control unit may run a fuel injector correction coefficient determining routine for each injector. For example, if the engine is a four cylinder engine and each engine has one injector, the fuel injector correction coefficient determining routine may be run four times, once for each injector.

The controller 12 requests the high pressure fuel supply pump (e.g., 82) to issue extra pump strokes, increase pump stroke frequency, and/or increase a pump stroke for at least one stroke so that the fuel pressure in the high pressure fuel rail (e.g., 80) reaches a predetermined target calibration pressure ($P_m$). Method 500 proceeds to 508.

At 508, method 500 12 turns off the high pressure fuel supply pump 82 so that no more fuel will be further supplied to the high pressure fuel rail 80 via fuel pump 82. Method 500 proceeds to 510.

At 510, method runs a series of fuel injections in a predetermined sequence (e.g., injector #1, injector #2, injector #3, injector #4, or in a firing order as prescribed for the engine) and repeat the sequence for a predetermined L number of times (e.g., 3 engine cycles, where each injector operates at least once during each engine cycle) while monitoring the fuel pressure (P) profile as a function of time or injection events in the fuel rail. Each of the fuel injections may be commanded to provide predetermined fuel injector pulse widths. The injection series may be schedules so that at the end of the injections, P reaches or falls below a normal operating target pressure ($P_n$), where $P_n$ is a desired target fuel pressure for the high pressure fuel reserve during normal fuel injection events. In some examples, the routine may monitor the fuel pressure in the high pressure fuel rail 80. The routine may also return the fuel pressure in the high pressure fuel rail back to a normal operating target pressure ($P_n$) before the start of the next calibration injection sequence, based on operating conditions, which may include engine operating conditions. Method 500 proceeds to 512.

At 512, method 500 calculates fuel pressure drop ($\delta p_i^T{}_{jk}$) due to each injection by the $j^{th}$ injector (e.g., k=1, 2, 3 . . . 9 if each injector is injected 3 times during a calibration injection cycle and the calibration injection cycle is run 3 times during a calibration event). $\delta p_i^T{}_{jk}$ corresponds to pressure drop in the high pressure fuel reserved due to injection by $j^{th}$ injector during the kth injection. Various engine operating conditions or events may affect fuel rail pressure measurements and may be taken into consideration when calculating the fuel pressure drop ($\delta p_i^T{}_{jk}$) attributed to each injection. In one example, the fuel pressure drop for a single injection of fuel may be determined via a first equation:

$$\delta p_i^T = \overline{p_i} - \overline{p_{i+1}} + \alpha_i \frac{T}{2} + \alpha_{i+1} \frac{T}{2},$$

where the variables are as previously described. Alternatively, the fuel pressure drop may be determined via a second equation:

$$\delta p_i^T = \overline{p_i} - \overline{p_{i+1}} + \alpha_i \frac{(T-x+y)}{2} + \alpha_{i+1} \frac{(T+x-y)}{2},$$

where the variables are as previously described. Method 500 proceeds to 514.

At 514, method 500 calculates an amount of fuel actually injected in each injection $Q_{jk}$, using the following equation:

$$Q_{jk} = \delta p_i^T{}_{jk}/C$$

where C is a predetermined constant coefficient for converting the amount of fuel pressure drop to the amount of fuel injected. In one example, C may be a function of fuel rail volume, effective bulk modulus of the fuel, and density of the fuel.

Method 500 may also determine an average amount of fuel actually injected by injector j ($Q_j$) using the following equation:

$$Q_j = \left(\sum_{k=1}^{k_{max}} Q_{jk}\right)/k_{max}$$

where k is number of injections by injector j (e.g., k=1, 2, 3 . . . 9 if each injector is injected 3 times during a calibration injection cycle and the calibration injection cycle is run 3 times during a calibration event), and $k_{max}$ is the largest k value (e.g., $k_{max}$=9 if each injector is injected 3 times during a calibration injection cycle and the calibration injection cycle is run 3 times during a calibration event).

Method 500 may determine correction factors for each fuel injector. In one example, method 500 may determine the correction factor via the following equation:

$$\text{Injcor}_j = \beta(\text{reqInj}_j - Q_j)$$

where $\text{Injcor}_j$ is the injector fuel injection correction amount for the $j^{th}$ injector, $\beta$ is a gain factor that may vary between 0 and 1, $\text{reqInj}_j$ is the amount of fuel that was requested to be injected by the $j^{th}$ injector during the injector calibration sequence, and $Q_j$ is the average amount of fuel injected by the $j^{th}$ injector during the injector calibration sequence. Of course, in other examples, the correction factors may be determined in alternative ways. Method 500 stores the correction factors in controller memory. Method 500 proceeds to 516.

At 516, method 500 may adjust requested amounts of fuel to be injected by the injection correction factors determined at 514. In one example, an amount of fuel that is requested to be injected may be multiplied by the fuel injector correction factor for the corresponding fuel injector that is scheduled to inject the requested amount of fuel to determine an adjusted fuel injection amount for a particular cylinder. Method 500 injects fuel amounts to the engine that are corrected via the correction factors.

At 515, method 500 retrieves fuel injection correction factors from controller memory that serve as a basis for correcting the amount of requested fuel to be injected to the engine cylinders. Method 500 proceeds to 516.

In this way, the method of FIG. 5 may adjust fuel injection amounts according to correction factors that are based on a pressure drop that is observed in a fuel rail. The pressure drop may be converted into a fuel mass and the fuel mass that is actually injected may be the basis for correcting an amount of fuel that is actually injected.

Thus, the method of FIG. 5 provides for a method for operating a fuel injector, comprising: estimating a fuel pressure drop in a fuel rail due to injecting a fuel via a fuel injector according to an average fuel pressure before injecting the fuel, an average fuel pressure after injecting the fuel, a slope of fuel pressure during an inter-injection period before injecting the fuel, and a slope of fuel pressure during an inter-injection period after injecting the fuel; and adjusting fuel injected subsequently via the fuel injector based on the estimated fuel pressure drop. The method further comprises estimating the fuel pressure drop based additionally on a half period of the inter-injection period before injecting the fuel. The method further comprises estimating the fuel pressure drop based additionally on a half period of the inter-injection period after injecting the fuel. The method further comprises estimating a mass of fuel injected based on the estimated fuel pressure drop. The method further comprises adjusting a pressure in the fuel rail to a predetermined pressure before injecting the fuel. The method includes where the pressure is adjusted via adjusting a fuel pump. The method further comprises deactivating the fuel pump after the pressure in the fuel rail is adjusted to the predetermined pressure.

The method of FIG. 5 also provides for a method for operating a fuel injector, comprising: estimating a fuel pressure drop in a fuel rail due to injecting a fuel via a fuel injector according to a portion of an inter-injection period where pressure samples are not applied to estimate the fuel pressure drop; and adjusting fuel injected subsequently via the fuel injector based on the estimated fuel pressure drop. The method includes where the inter-injection period is after injecting the fuel. The method further comprises estimating the fuel pressure drop in further response to an average fuel pressure before injecting the fuel, an average fuel pressure after injecting the fuel, a slope of fuel pressure during an inter-injection period before injecting the fuel, and a slope of fuel pressure during the inter-injection period after injecting the fuel. The method includes where the inter-injection period is before injecting the fuel. The method further comprises estimating a mass of fuel injected based on the estimated fuel pressure drop.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
an engine including a fuel injector; and
a controller with computer readable instructions stored on non-transitory memory that when executed cause the controller to:
estimate a change in fuel pressure according to an average fuel pressure before a preceding fuel injection, an average fuel pressure after the preceding fuel injection injecting a fuel, a slope of fuel pressure during an inter-injection period before injecting the fuel, and a slope of fuel pressure during an inter-injection period after injecting the fuel; and adjust an amount of fuel injected by the fuel injector in response to a change in fuel pressure in a fuel rail before the preceding fuel injection by the fuel injector and in response to a change in fuel pressure after the preceding fuel injection by the fuel injector.

2. The engine system of claim 1, where the change in fuel pressure in the fuel rail before the preceding fuel injection is during an inter-injection period immediately before the preceding fuel injection.

3. The engine system of claim 1, where the change in fuel pressure in the fuel rail after the preceding fuel injection is during an inter-injection period immediately following the preceding fuel injection.

4. The engine system of claim 1, further comprising additional instructions that cause the controller to estimate the change in fuel pressure based on a half period of the inter-injection period before the preceding fuel injection.

5. The engine system of claim 4, further comprising additional instructions that cause the controller to estimate the change in fuel pressure based on a half period of the inter-injection period after the preceding fuel injection.

6. A method for operating a fuel injector, comprising:
estimating a fuel pressure drop in a fuel rail due to injecting a fuel via the fuel injector according to a portion of an inter-injection period where pressure samples are not applied to estimate the fuel pressure drop; and
adjusting fuel injected subsequently via the fuel injector based on the fuel pressure drop;
where estimating the fuel pressure drop is in response to an average fuel pressure before injecting the fuel, an average fuel pressure after injecting the fuel, a slope of fuel pressure during the inter-injection period before injecting the fuel, and a slope of fuel pressure during the inter-injection period after injecting the fuel.

7. The method of claim 6, further comprising estimating a mass of fuel injected based on the fuel pressure drop.

* * * * *